United States Patent

[11] 3,547,178

[72] Inventor Jacques Boileau
 Clermont-Ferrand, France
[21] Appl. No. 674,566
[22] Filed Oct. 11, 1967
[45] Patented Dec. 15, 1970
[73] Assignee Compagnie Generale Des Etablissements
 Michelin, raison sociale Michelin & Cie,
 Clermont-Ferrand
 Puy-de-Dome, France
[32] Priority Oct. 13, 1966
[33] France
[31] No. 79940

[54] PNEUMATIC TIRES AND ADAPTABLE RIMS THEREFOR
 13 Claims, 7 Drawing Figs.
[52] U.S. Cl. .................................................... 152/381
[51] Int. Cl. .................................................... B60c 3/00
[50] Field of Search............................................. 152/352,
 353, 158, 378—384, 380, 396, 381

[56] References Cited
 UNITED STATES PATENTS

| | | | |
|---|---|---|---|
| 512,727 | 1/1894 | Lindner...................... | 152/381 |
| 1,756,665 | 4/1930 | Shoemaker................. | 152/381 |
| 2,126,223 | 8/1938 | Schwinn..................... | 152/381 |
| 2,198,978 | 4/1940 | Sauer......................... | 152/381 |
| 2,822,016 | 2/1958 | Billingsley.................. | 152/352 |
| 3,392,772 | 7/1968 | Powers....................... | 152/158 |
| 399,355 | 3/1889 | Thomas...................... | 152/380 |
| 1,274,237 | 7/1918 | Boryszewski................ | 152/396 |

FOREIGN PATENTS

| | | | |
|---|---|---|---|
| 1,327,812 | 4/1963 | France....................... | 152/352 |
| 362,782 | 9/1938 | Italy........................... | 152/381 |

Primary Examiner—Arthur L. La Point
Assistant Examiner—Richard A. Bertsch
Attorney—Brumbaugh, Graves, Donohue & Raymond ABSTRACT: An improved mount for pneumatic tires on vehicle wheel rims wherein the rim has a concave surface having an angle of opening not exceeding approximately 150° of an arc of a circle and complementary surfaces at the inner edges of the tire overlapping the concave surface of the rim by an angle of at least 10°.

INVENTOR
JACQUES BOILEAU

BY Brumbaugh Free Graves & Donohue his ATTORNEYS.

INVENTOR.
JACQUES BOILEAU

PNEUMATIC TIRES AND ADAPTABLE RIMS THEREFOR

The present invention relates to the mounting of pneumatic tires on vehicle wheel rims and, more particularly, to improvements in rims and tires for more satisfactory mounting and retention of the tires on the rims.

Since the introduction of pneumatic tires, numerous systems have been provided for removably attaching a tire to the rim of a wheel. The systems which have prevailed include either rim flanges or a wedging action, or both to secure the tire to the rim. When the tire is secured to the rim by rim flanges, the rim has two rim flanges perpendicular to the axis of the rim against which the beads are forced by the inflation pressure. When the tire is secured to the rim by wedging action, the beads of the tire engage conically shaped bead seats on the rim. Inasmuch as the beads are rendered inextensible for all practical purposes by the presence of a circumferential bead wire or cable, they are wedged on the rim and the wedging action is increased by inflation pressure.

All currently manufactured tires are attached to their rims by the use of a combination of these systems. In some instances, especially with rims having pronounced conic seats, the wedging effect is predominant. At other times, especially with use of flat rims or rims with only slightly conical seats, the rim flange effect is predominant. But in all cases, it is the cooperation between the beads of the tire, the rim flanges and the conical seats for the beads, which assures the attachment of the tire to the rim.

While this system provides high quality attachments and has been successfully used in the industry for many years, it is not free from disadvantages, particularly under extreme conditions of tire use.

One disadvantage of the present system is that the retention of the beads on the seats is not assured under all operating conditions. The deformation of the tire during operation can cause an axial displacement of the bead on its seat. In curves taken at high speed, the deformations of the tire are much greater and, in this situation, can result in a momentary disengagement of the tire bead from its rim. Such disengagement is, of course, undesirable, and even dangerous, especially with tubeless tires which require a tight contact of bead and rim to prevent loss of pressure.

A second disadvantage is that the wedge seats and the rim flanges work, in general, independently of each other and do not supplement one another, at least not with maximum effectiveness. This independence of wedge and rim flange effects is a consequence of the fact that it is practically impossible to make the tire bead of such shape and rigidity that its lower and outer walls will be applied with equal pressure against the wedge seats on the rim and the rim flanges. As a result, the seats for the beads and the rim flanges act independently of one another and, under some circumstances, their actions even oppose each other. Thus, the presence of the rim flanges frequently limits the engagement of the bead with the wedge seat and may tend to cause them to disengage by supplying a point of support around which the bead on the inside of the wheel, during the curve, can pivot or be deflected.

Another disadvantage of the present system is that the rim flanges cause the sidewalls of the tire to be deflected outwardly just outside the rim flanges. This change of curvature is, of course, harmful to the tightness of the engagement of the rim and the tire. It also subjects the zone of the juncture of the bead and the sidewall to intermittent contacts with the rim flanges and the friction and bending, which are the results of these contacts, cause severe fatigue and abrasion in this region of the sidewall. This condition further results in an inefficient utilization of the materials of which the rim and the tire are made, for it requires shaping of the metal of the rim to form the rim flanges and reinforcement and modification of the sidewalls of the tire to form the beads.

In accordance with the present invention there is provided a new system for attaching the tire to its rim which is both simpler and more effective than prior systems.

More particularly, in accordance with the present invention, a rim is provided wherein seats and the rim flanges form an extension of one another and act as one surface to accommodate each bead. This surface has an inclination of intermediate value, i.e., an inclination from the axis of the rim which, when measured from any point whatever on this surface, is always considerably different from 0° as well as from 90°, that is an inclination different from the inclination of the bead seats and flange edges of the systems now in use. The tire has its inner edge portion and sidewall combined in one surface which extends into the sidewall without deformation to the inner edge of the tire. The rim and the tire in combination form a closed space with a substantially circular transverse cross section in which the inner edge portions of the tire overlap the rim along complementary surfaces which are concave for the rim and convex for the inner edge portion of the tire with the angle of opening of the rim not exceeding approximately 150° of an arc of a circle and each of the inner edge portions overlapping the rim by an angle of at least 10° and preferably at least 15°. While the inner edge portions of the tire which engage the rim are not "beads" as this term is commonly used in describing a tire structure, the term "beads" will be used hereinafter in referring to the portions of the tire which engage the rim.

In the system of attaching the tire and rim in accordance with the present invention, the effect of the rim flange and the effect of the conventional bead are wholly and permanently superimposed inasmuch as they are obtained by one and the same surface of the rim acting on one and the same surface of the bead under the effect of the inflation pressure. The contact surfaces of the bead and rim act uniformly and with maximum effectiveness in supporting the tire and securing it to the rim.

In accordance with a preferred embodiment of the present invention, the tire is centered on the rim by engagement of the rim edges with projecting ribs or ridges, by preference ring-shaped, on the sidewalls of the tire which bear against the edges of the rim and grip them. Tests have shown that the projecting ribs of both reinforced and nonreinforced rubber, which bear against the flange edges of the rim are sufficient to maintain proper centering of the tire on the rim, in spite of the deformations caused by rolling of the tire.

In accordance with another embodiment of the present invention, the tire is molded so that the beads are spaced farther apart from one another in their normal unmounted position than they are when they are in their place on the rim. This arrangement assures contact between the outer wall of the bead and the rim when the tire is placed on the rim, prior to any inflation.

In accordance with another embodiment of the present invention, the beads of the tire do not include a bead wire but are reinforced exclusively over their entire extent by at least one ply of inextensible metal wires which are substantially parallel and inclined at an acute angle of approximately 5° to the inner edge of the bead as described in U.S. Pat. No. 2,966,933. This type of reinforcement, in contrast to a bead equipped with a conventional bead wire, gives the bead a limited extensibility in the circumferential direction coupled with increased rigidity in the transverse direction, a condition which augments positioning and maintenance of proper centering of the tire on the rim, while, at the same time, limiting warping of the bead.

In accordance with yet another embodiment of the present invention, a safety packing consisting of a cellular material which expands when the inflation pressure decreases is placed on the bottom of the rim between the beads of the tire. This packing insures proper functioning of the tire when the inflation pressure becomes very low or zero, as the result of accidental deflation or a blowout.

A further embodiment of the present invention includes a pair of abutments on the inside of the rim which limit the movement of the beads into the rim to prevent any eccentricity of the tire in relation to the rim from developing when the inflation pressure decreases.

A still further embodiment of the present invention which insures proper functioning of the tire under low inflation pressure provides for the two beads to enter deeply into the rim so that they serve as mutual stops when the inflation pressure decreases.

In accordance with still other embodiments of the present invention, the two sides of the rim and/or tire can by unsymmetrical. For example, the two edges of the rim may have different or equal diameters with different or equal radii of transverse curvature. Actually, in comparison to rims and tires now in use, the structure of the rim and tire in accordance with the present invention lends itself much more easily to such dissymmetries.

The system of attaching a tire and a rim in accordance with the present invention offers a number of advantages over the present system in addition to the primary advantage of a better connection of the tire and the rim. One advantage is in the case of mounting the tire on the rim. To mount the tire, one merely places it obliquely in relation to the rim and exerts pressure so that the beads position themselves within the two edges of the rim. As soon as inflation starts, the tire is positioned securely against the rim.

Inasmuch as seating of the tire without vertical support by rim flanges dampens shocks, a second advantage is a gain in riding comfort for the passengers which is especially noticeable when the vehicle is passing over obstacles or traveling on an unpaved road.

A third advantage is a gain in stability at high speed. This gain is due to a reduction of the height of the sidewall through elimination of the zone in which there is a change of the curvature, i.e., at the junction of the sidewall and the bead, and to the increased rigidity of the bead in the transverse direction.

Another advantage is a reduction in wear and tear due to the elimination of contacts between the sidewalls and the rim flanges. The tread of the tire also contacts the road better while negotiating curves at high speeds so that there is less tendency for wear to become localized at the edges of the tread.

Finally, the rim and tire of the present invention are easily and economically manufactured. The extremely simple form of the transverse profile of the rim permits easy and economical manufacture of such rims. The elimination of the bead wires from the beads also adds to simplification of tire manufacture.

For a better understanding of the present invention, reference may be had to the accompanying drawings in which.

Figure 1:
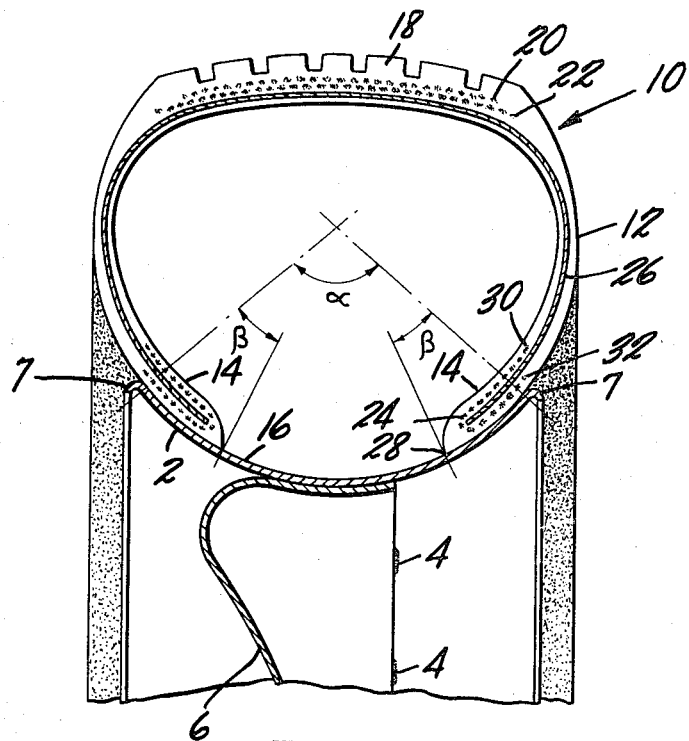
FIG. 1 is a cross-sectional view of a tire and rim embodying the present invention.

As shown in FIG. 1 a ring-shaped rim 2 is welded at 4 to a wheel disc 6. The rim 2 consists of a steel plate shaped in the form of an arc of a circle having an angle of opening $\alpha$ which is, in this illustrative embodiment, 100°. Each of the edges of the rim 2 is curved towards the axis of the rim so as to form a rounded rim edge 7. The tire cover 10 has a radial carcass 12, beads 14 which are held against the inner wall 16 of the rim 2 by the inflation pressure and a tread 18 made rigid by a reinforcement consisting of two plies of cords 20 and 22 which run parallel in each ply and with the cords of one ply crossing the cords of the other ply. The zone of each bead 14 covered by the rim 2 extends over an area which corresponds to the angle $\beta$ which in this embodiment is 23°.

In the embodiment shown in FIG. 1, the beads 14 do not include the customary bead wire which is used as a reinforcement but have only a ply of cords 24 forming an angle of approximately 85° with the radial direction folded over both sides of the radial carcass cords 26. This ply 24 extends from near the edge 28 of the beads 14 to the points 30 and 32 located at different heights above the rim flange 7 of the rim 2.

Figure 2:
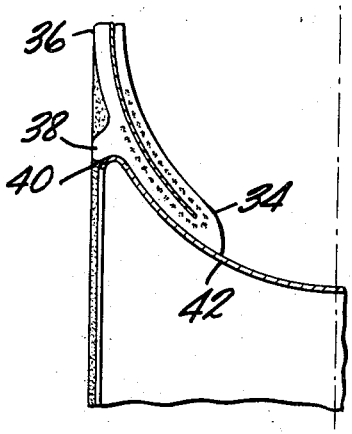
FIG. 2 is a cross-sectional view of a tire and rim illustrating another embodiment of the present invention.

In the embodiment shown in FIG. 2, the bead 34 of the tire cover 36 has molded on its sidewall a projecting rib 38 which bears against the convex surface of the rim flange 40 of the rim 42. The locking effect of the projecting edge 38 and flange 40 insures maintenance of proper centering of the tire on the rim despite deformations of the tire which occur during operation.

Figure 3:
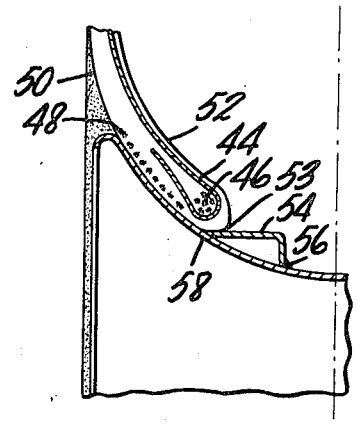
FIG. 3 is a cross-sectional view of a tire and rim illustrating a third embodiment of the present invention.

In the embodiment according to FIG. 3, the radial carcass cords 44 are folded over an annular bead wire or cable 46 consisting of steel wires. A narrow ply of metal cords 48 which cross the radial carcass cord 44 is placed on the rim side of the tire cover 50 to give this portion of the bead 52 an increased transverse rigidity which in turn increases the stability of the tire. Maintenance of proper centering of the tire on the rim is assured by having the edge of each bead 53 engage a ring-shaped abutment 54 welded on the inner wall 56 of the rim 58.

Figure 4:
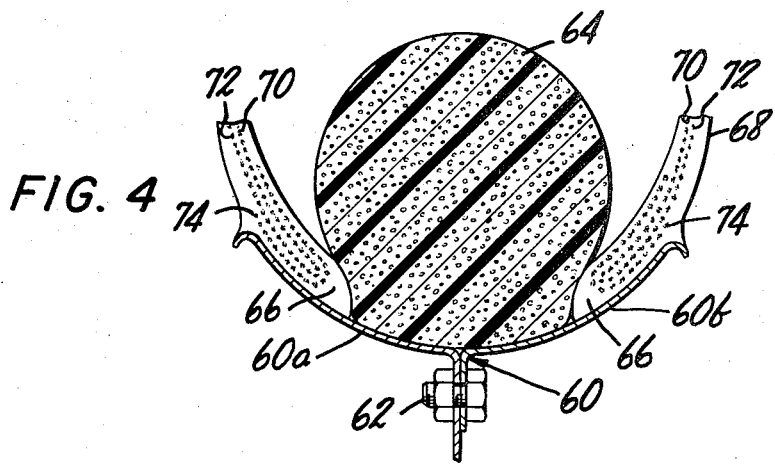
FIG. 4 is a cross-sectional view of a tire and rim illustrating a fourth embodiment of the present invention.

The embodiment shown in FIG. 4 differs from the embodiments described above in that the rim 60 consists of two halves 60a and 60b connected to each other by means of bolts 62. A second difference is the inclusion of a safety filler 64 consisting of a foam-type elastomer as, for example, polyurethane foam, having gastight cells which expand when the inflation pressure decreases. The safety filler 64 is placed on the bottom of the rim 60 between the two beads 66 of the tire cover 68 and functions to carry the load of the vehicle in case of accidental deflation of the tire. In addition, the filler also serves as a stop for the beads 66 if the tire is deflated and thus assures maintenance of proper centering. In this embodiment, the beads 66 are stiffened by two cross-carcass plies 70 and 72 complemented by a ply of cords 74 similar to the ply 24 of FIG. 1.

Figure 5:
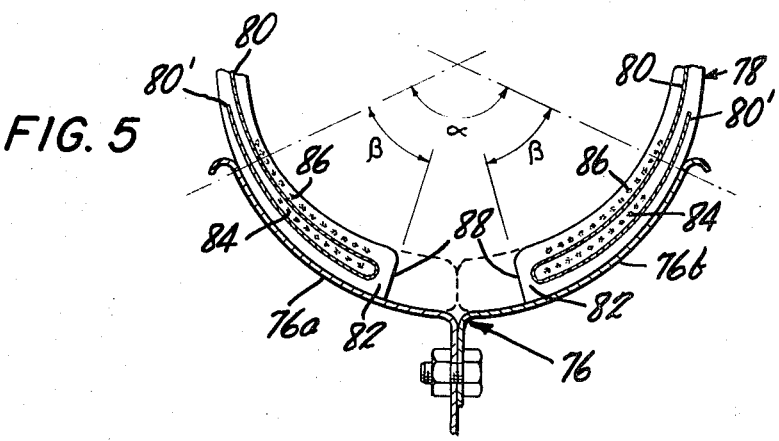
FIG. 5 is a cross-sectional view of a tire and rim illustrating a fifth embodiment of the present invention.

In the embodiment shown in FIG. 5, rim 76 is in two parts 76a and 76b as in FIG. 4 but in this case the angle of opening $\alpha$ is 130° instead of 100°. The tire cover 78 includes a radial carcass ply 80 having a folded-back portion 80' in each of the beads 82. The beads are stiffened by two plies of metal cords 84 and 86 inclined at the angle of 80° to the radial direction, with the cords of ply 84 crossing those of ply 86. The ply 84 is enclosed between the carcass ply 80 and its folded back portion 80' while the ply 86 is located between the ply 80 and the air chamber of the tire cover 78. The zone of each of the beads 82 covered by the rim 76 corresponds to the angle to the center $\beta$ which in this embodiment is 48°. The edges 88 of the beads are thus at a small distance from one another and in case of deflation of the tire serve as mutual stops for one another, as shown in phantom, to maintain proper centering of the tire on the rim.

Figure 6:
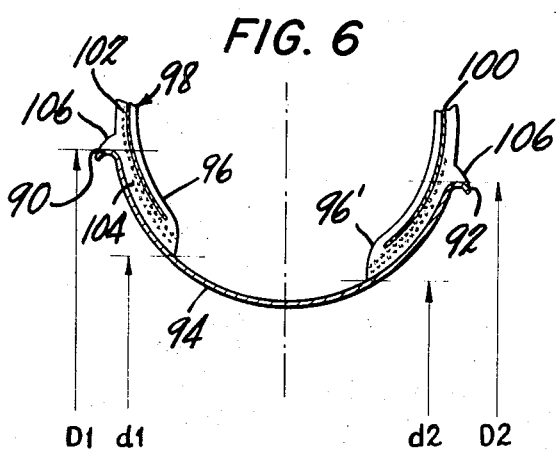
FIG. 6 is a cross-sectional view of a tire and rim illustrating another embodiment of the present invention.
Figure 7:
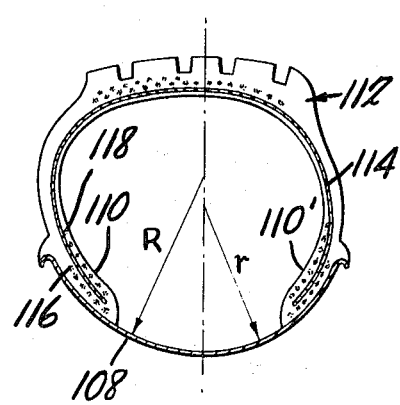
FIG. 7 is a cross-sectional view of a tire and rim illustrating still another embodiment of the present invention.

The embodiments shown in FIGS. 6 and 7, are assymmetrical. Assymmetrical rims and tires are used, for example, in high-speed driving where the tires roll at high speeds in curves, and take into account the different behaviors of the two halves of the tire on either side of its median plane.

In FIG. 6, this assymmetry is an assymmetry of the diameter of the flange edges 90 and 92 of the rim 94. The diameter D1 of flange edge 90 is greater than the diameter D2 of flange edge 92. Likewise, bead 96 of the tire cover 98 has a diameter $d1$ which is greater than the diameter $d2$ of the bead 96'. These two beads are stiffened by a ply of radial carcass cords 100 and two plies of metal cords 102 and 104 which correspond to the plies of metal cords 84 and 86 of FIG. 5, but here both plies are placed on the outside of ply 100. The beads 96 and 96' have molded into their sidewalls a projecting edge 106 which grips the edges of the rim 90 and 92.

The assymmetry of FIG. 7 is an assymmetry of the radius of curvature of the rim 108 and the beads 110 and 110' of the tire cover 112. The radius R of the left half of the rim is longer than the radius $r$ of the right half of the rim. The beads 110 and 110' have radii of curvature corresponding to radii R and $r$, respectively. The beads are stiffened by a ply of radial carcass cords 114 and two plies of metal cords 116 and 118 in a manner similar to that shown in FIG. 6, except that plies 116 and 118 are located on either side of the radial carcass ply 114.

It will be apparent to those skilled in the art that many modifications can be made to the present invention without departing from its spirit and scope. For example, the tire may include an inner tube which is either separate or can be incorporated in the form of an airtight covering on the tire cover inner wall. Although surfaces of toric shape are preferred for the beads and the corresponding portions of the rim, it is nevertheless possible, without departing from the scope of the present invention to use nontoric surfaces of revolution which are more or less similar to toric surfaces, e.g., conic surfaces with an angle of inclination corresponding to an angle of opening of the rim of the same magnitude as that of toric surfaces. Therefore, the present invention is not deemed to be limited except as defined in the appended claims.

I claim:

1. A system for mounting a tire on a rim comprising a rim having a concave outer surface forming continuous concave seats extending from the lateral edges of said rim inwardly toward its center, a tire for mounting on said rim having a tread, sidewalls and bead portions at the inner edges of said sidewalls, said bead portions forming continuations of said sidewalls and having convexly curved outer surfaces continuous with the outer surfaces of said sidewalls and complemental to the seats on said rim, said outer surface of said rim having an angle of opening not exceeding 150° of an arc of a circle and said bead portions of said tire engaging said seats over an angle of at least 10°, the seats forming unbroken surfaces where they are engaged by said bead portions.

2. The system for mounting a tire on a rim according to claim 1 wherein said angle of opening of said rim is between approximately 100° and 150°; and wherein said overlapping of each of said inner edge portions of said tire by said rim corresponds to an angle of between approximately 10° and 50°.

3. The system for mounting a tire on a rim according to claim 2 comprising a packing consisting of a foamed elastomeric material between said bead portions of said tire on the bottom of said rim and extending into said tire.

4. The system for mounting a tire on a rim according to claim 2 wherein said tire is molded in a manner whereby said inner edge portions of said tire are separated from each other by a distance which is greater when said inner edge portions are in the normal unmounted position than when said inner edge portions are in their place on said rim.

5. The system for mounting a tire on a rim according to claim 2, further comprising reinforcement means extending at least over the area where said bead portions contact said bead seats, said reinforcement means comprising in each of said bead portions two plies of parallel cords, the cords of one ply crossing those of the other ply.

6. The system for mounting a tire on a rim according to claim 2, wherein said inner edge portions of said tire enter deeply into said rim so that they serve as mutual stops when the inflation pressure decreases.

7. The system for mounting a tire on a rim according to claim 2, wherein said rim comprises abutments on its outer surface for limiting movement of said inner edge portions of said tire into said rim.

8. The system for mounting a tire on a rim according to claim 2 wherein the seats of said rim form a single concave surface, said rim edges being curved toward the axis of said rim, and wherein each of the sidewalls of said tire comprises a projecting rib which bears against and grips said edges of said rim.

9. The system for mounting a tire on a rim according to claim 8 wherein said rib is ring-shaped.

10. The system for mounting a tire on a rim according to claim 8, wherein said rim is composed of two ring-shaped halves which are connected to each other in a separable manner.

11. The system for mounting a tire on a rim according to claim 8, wherein one of said edges of said rim has an outer diameter which is different from the outer diameter of the other rim edges.

12. The system for mounting a tire on a rim according to claim 8, wherein said outer surface of said rim has an assymmetric cross-sectional curvature.

13. A system for mounting a tire on a rim comprising a rim having a concave outer surface forming continuous concave seats extending from the lateral edges of said rim inwardly towards its center, a tire for mounting on said rim having a tread, sidewalls and bead portions at the inner edges of said sidewalls, said bead portions forming continuations of said sidewalls and having convexly curved outer surfaces continuous with the outer surfaces of said sidewalls and complemental to the seats on said rim, said outer surface of said rim having an angle of opening between approximately 100° and 150° of an arc of a circle and each of said bead portions of said tire engaging said seats over an angle of between approximately 10° and 50°, further comprising at least one ply of parallel cords reinforcing said inner edge portions of said tire and inclined at an acute angle of approximately 5° to the inner edges of said beads.